No. 878,169.
PATENTED FEB. 4, 1908.
C. A. WHITEHORN.
INDICATOR FOR BALING PRESSES.
APPLICATION FILED MAY 22, 1907.
2 SHEETS—SHEET 1.
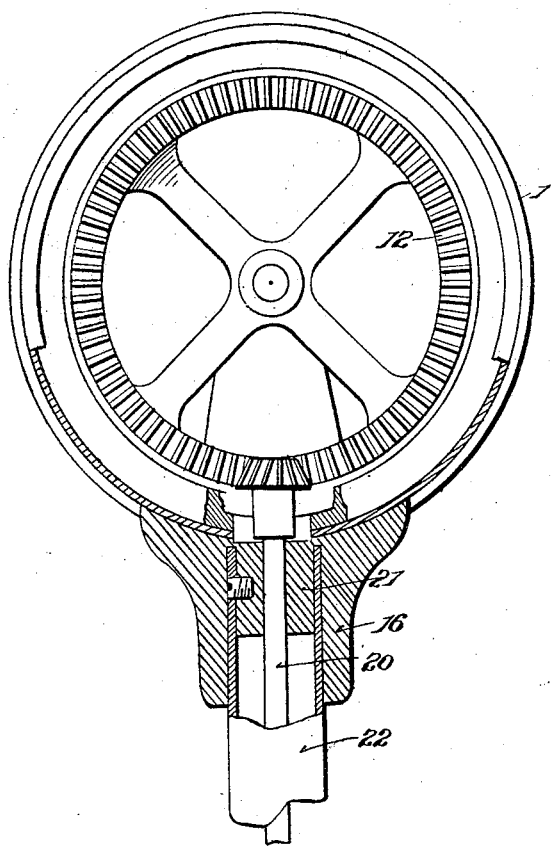
FIG. 1.
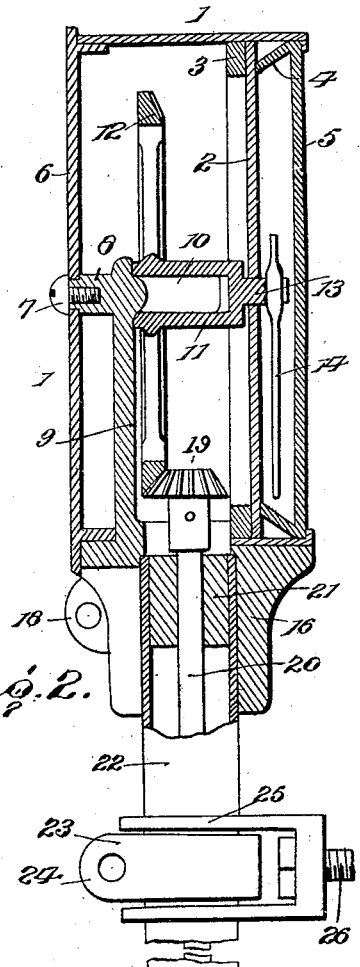
FIG. 2.
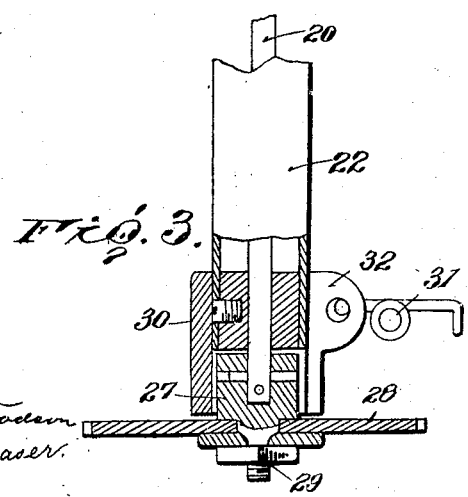
FIG. 3.
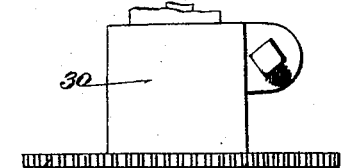
Inventor
C. A. Whitehorn.
Witnesses
By
Attorneys

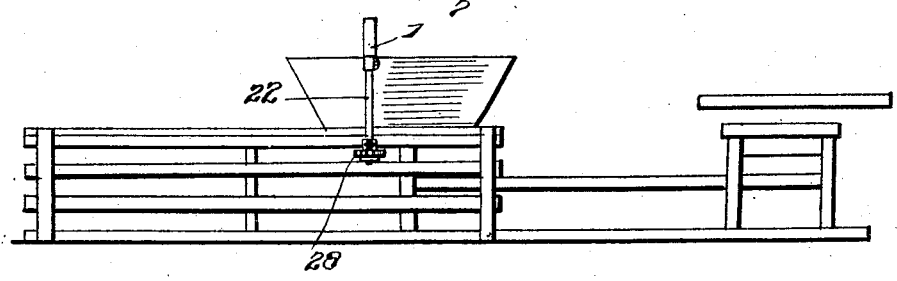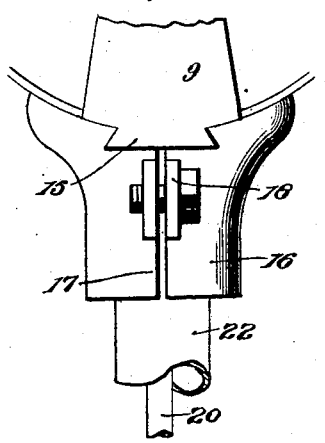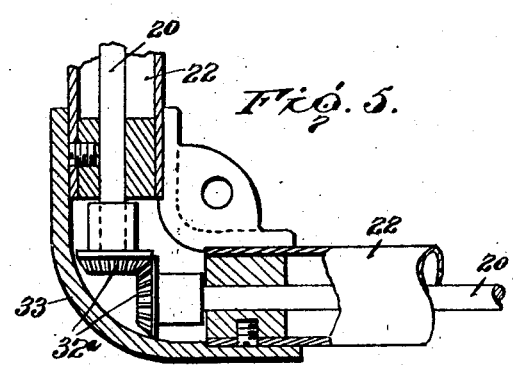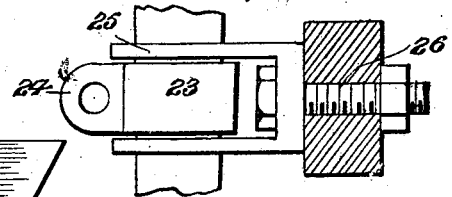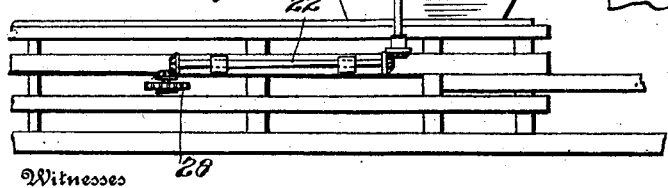

UNITED STATES PATENT OFFICE.

CHESTER A. WHITEHORN, OF LAWTON, IOWA.

INDICATOR FOR BALING-PRESSES.

No. 878,169.  Specification of Letters Patent.  Patented Feb. 4, 1908.

Application filed May 22, 1907. Serial No. 375,094.

*To all whom it may concern:*

Be it known that I, CHESTER A. WHITEHORN, citizen of the United States, residing at Lawton, in the county of Woodbury and State of Iowa, have invented certain new and useful Improvements in Indicators for Baling-Presses, of which the following is a specification.

This invention contemplates certain new and useful improvements in automatic block indicators, the invention being designed particularly for use in connection with baling presses to indicate to the operator the successive stages of completion of each bale, so that he may determine what quantity of hay is necessary for the completion of the bale, although it is evident that the invention is equally applicable to other and diversified uses.

The invention has for its primary object a simple, durable and efficient construction of indicator of this character which may be attached to or incorporated with any style or type of baling press, and without the necessity for using flexible shafting to secure the parts to the press at the desired or necessary relative inclinations.

With this and other objects in view as will more fully appear as the description proceeds, the invention consists in certain constructions, arrangements and combinations of parts that I shall hereinafter fully describe and then point out the novel features in the appended claims.

For a full understanding of the invention and the merits thereof and also to acquire a knowledge of the details of construction of the means for effecting the result, reference is to be had to the following description and accompanying drawings, in which:

Figure 1 is a face view, partly in section, of the casing end of my improved indicator; Fig. 2 is a vertical transverse sectional view thereof; Fig. 3 is a detail view, partly in section and partly in elevation of the bale end of the indicator mechanism; Fig. 4 is a side elevation of a baling press showing one application of my invention; Fig. 5 is a detail sectional view illustrating the coupling between angularly disposed sections of sheathing and their inclosed shafting; Fig. 6 is a detail rear view of the base piece of the indicator casing and its related parts. Fig. 7 is a detail view of one means for securing the mechanism to the hopper or other portions of the framework of a baling press; and, Fig. 8 is a side elevation illustrating a modified arrangement of the parts.

Corresponding and like parts are referred to in the following description and indicated in all the views of the drawings by the same reference characters.

The casing 1 of my improved indicator may be of any desired construction, size and design, and in the present instance, is shown as cylindrical. The case 1 is provided with a face plate or dial 2 held against the annular support 3 by means of a fillet or spacer 4 interposed between the dial and a glass cover 5.

6 designates the removable back plate of the casing, which may be secured in place by a screw 7 working in the rearwardly extending stub or boss 8 of a vertically extending bracket 9 mounted within the casing. The bracket 9 is formed with a forwardly extending pin or stub shaft 10 on which is journaled the hollow hub 11 of the main gear wheel 12. The hub 11 of this wheel is formed with an extension 13 protruding forwardly through the dial or face plate 2, and a pointer 14 is secured on the protruding end of the hub so as to swing around over the face of the dial 2 when the wheel 12 is turned.

The bracket 9 is formed with a preferably dove-tail tongue 15 which is seated within a correspondingly shaped recess in the upper end of the base piece 16. This base piece supports the casing 1, and is split at its rear as indicated at 17, or, in other words is formed at the rear with a vertically extending slot, the two parts bordering on said slot being provided with outstanding ears 18 that are apertured so that a binding screw or bolt may pass through them to compress the base piece 16.

A bevel pinion 19 meshes with the bevel gear wheel 12, and the said pinion is secured fast on the upper end of the shaft 20 which is journaled at its upper end in the bushing 21 held by a pin or other suitable means within the upper end of a sheath 22. This sheath 22 with the parts which it incloses is mounted within the base piece 16. Hence, it will be seen that by tightening the bolt passing through the ears 18 all of these parts may be secured in place as well as the bracket 9.

It is to be understood, as indicated above, that my improved indicator is adaptable to presses of different types and structures, and it is within the purview of my invention to secure the parts in operative positions with respect to the press framework, by any suitable means and by any suitable arrangement, no matter what the peculiarity of the said framework may be. For instance, I may employ but one shaft 20 with the pinion 19 at one end and with the spur wheel, that is intended to engage with the bale at the other end. With such arrangement, or, if desired, with other arrangements hereinafter described, I may secure a split collar 23 on the sheath 22, said collar being provided with apertured ears 24 designed to receive a clamping bolt or screw, and I may provide a yoke 25, the members of which are apertured to receive the sheath and which are designed to embrace the upper and lower sides of the clamping collar 24, the cross piece of said yoke receiving a bolt 26 by which the yoke may be secured to any desired portion of the press framework. By this arrangement, it is manifest, the sheath 22 may turn or move to the desired extent with respect to the yoke which supports it. The lower end of the shaft 20 is mounted within a bushing 21, by a pin or the like, in the lower end of the sheath 22, and the shaft 20 projects beyond said bushing. A block 27 is secured by a pin or the like on the projecting lower end of the shaft, and said block is formed with a polygonal extension on which the spur wheel 28 is secured, said spur wheel being designed to be actuated by the movement of the bale under its successive stages of completion. The spur wheel 28 may be secured fast on the extension of the block 27 by means of a nut and washer 29. In order to hold the spur wheel 28 in yielding and proper operative engagement with the bale, I may mount upon the lower end of the sheath 22, a split collar 30 which is provided with apertured ears 32 designed to receive a bolt to clamp the collar around the sheath. A spring hook 31 may engage the bolt between the ears and also may engage any portion of the framework, so as to yieldingly hold the spur wheel 28 against the bale.

If the press framework is of such type or construction that the necessity of changing the direction of drive arises, or if for any other reason, such change of direction is desirable, I may employ any number of shafts 20, held in meshing or operative engagement with each other, and at any desired angle or inclination. Such an arrangement of parts is illustrated in Fig. 8, where it will be seen that the several sections of shafting are disposed at angles to each other and are provided at their adjacent ends with miter pinions 32ª. In order to hold the several sections of sheathing 22 at the desired angle, I provide elbow couplings 33, the two ends or portions of which may have any desired angular disposition. Said elbow couplings 33 are each split at one side, preferably the inner or shorter side, as illustrated in the drawings, and at such split side apertured ears 32 are formed so as to receive the clamping bolt or nut.

From the foregoing description in connection with the accompanying drawings, it will be seen that I have provided a simple, durable and efficient construction of automatic block indicator, which may be readily applied to any type or structure of baling press, and in which the shafting between the wheel 12 and the spur gear or wheel 28 may take any desired number of turns or be straight if desired, in order to hold the several parts at the desired or requisite angles or inclinations.

It is to be understood that the invention is not limited to any particular means or arrangement of parts for securing the indicator to any type or structure of baling press framework.

Having thus described the invention, what is claimed as new is:

1. An indicator of the character described, comprising a casing, a gear wheel mounted in said casing, the casing being provided with a face plate, a pointer carried by said gear wheel and adapted to be passed over the face of the said plate, a shaft provided with a pinion meshing with said gear wheel, a sheathing in which said shaft is journaled, a bracket forming a support for the gear wheel and formed with a dove-tailed tongue, a compressible base piece inclosing the upper end of said sheathing and formed with a recess in which said tongue fits, means for compressing said base piece around the tongue and sheath, a spur gear secured to said shaft, and means for supporting the aforesaid parts on the framework of a baling press.

2. The combination with a baling press framework, of a yoke secured thereto, a sheathing mounted in said yoke, a collar secured to the sheathing between the members of the yoke and supporting the sheathing within the yoke, shafting mounted in said sheathing, a spur wheel carried by said shafting and adapted to engage with the bale to turn the shaft as the bale is completed, a clamping collar secured to said sheathing, a yielding connection between said collar and the framework, whereby to hold the spur wheel in yielding engagement with the bale, a base piece secured to the upper end of said sheathing, a casing secured on said base piece, a gear wheel mounted in said casing and having a driving connection with the shafting, and a pointer carried by said gear wheel, the casing being provided with a dial around which the pointer is adapted to sweep.

3. An indicator of the character described, comprising a casing, a bracket mounted in said casing, provided with a forwardly extending stub shaft, an actuating gear wheel formed with a hollow hub journaled on said shaft, the casing being provided with a dial, and the hub being provided with a projection protruding forwardly through the dial, a pointer secured to the protruding end of the hub, the said bracket being provided with a dove-tailed tongue, a base piece split at its rear end and formed with apertured ears at opposite sides of the split, a clamping bolt working through said ears to compress the base piece, said base piece being formed with a recess in which the tongue of the bracket fits, sheathing mounted in the base piece, a shaft journaled in said sheathing, a pinion meshing with the gear wheel and secured on said shaft, a yoke provided with apertured members accommodating the sheathing, a fastening bolt secured to the cross piece of said yoke, a collar clamped on the sheathing and mounted between the members of the yoke whereby to support the sheathing from the yoke, a spur gear mounted on the lower end of said shaft, a collar mounted on the lower end of the sheathing and provided with apertured ears, a bolt working through said ears and adapted to draw the ears together whereby to compress the collar around the sheathing, and a spring hook connected to the bolt and designed for attachment to a press framework.

In testimony whereof I affix my signature in presence of two witnesses.

CHESTER A. WHITEHORN. [L. S.]

Witnesses:
G. A. GILBERT,
E. JAS. GILBERT.